W. G. STEPHENSON.
SUGAR CANE PLANTER.
APPLICATION FILED DEC. 24, 1917.
1,280,895.
Patented Oct. 8, 1918.
3 SHEETS—SHEET 3.
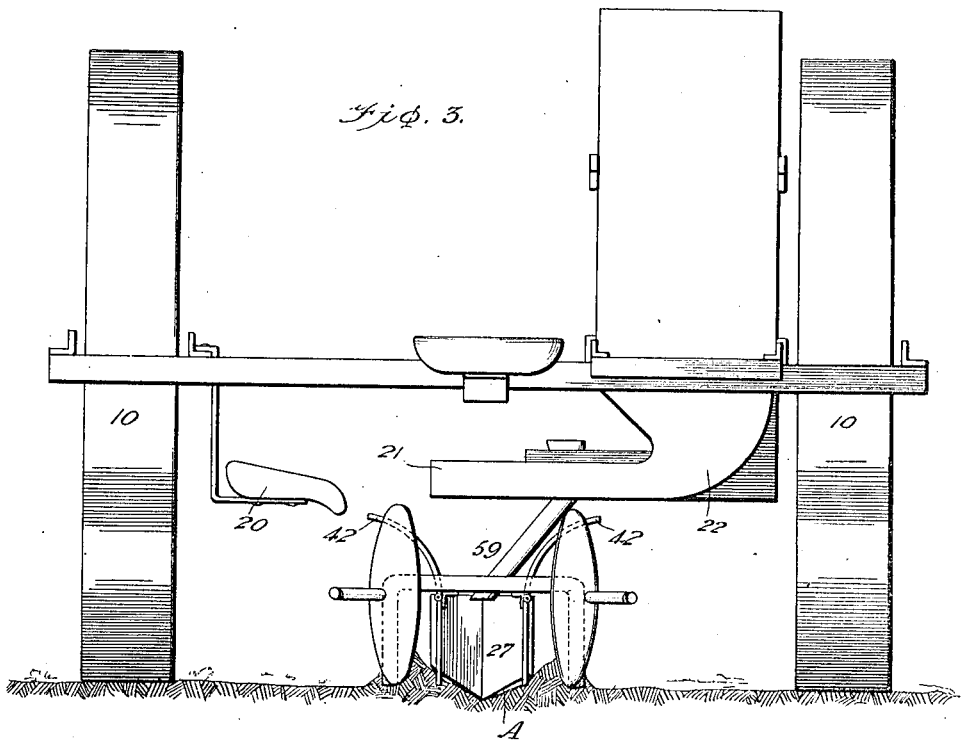
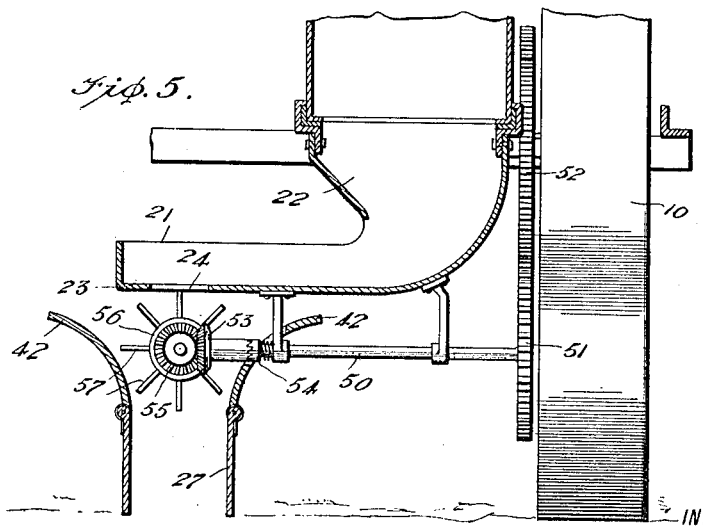

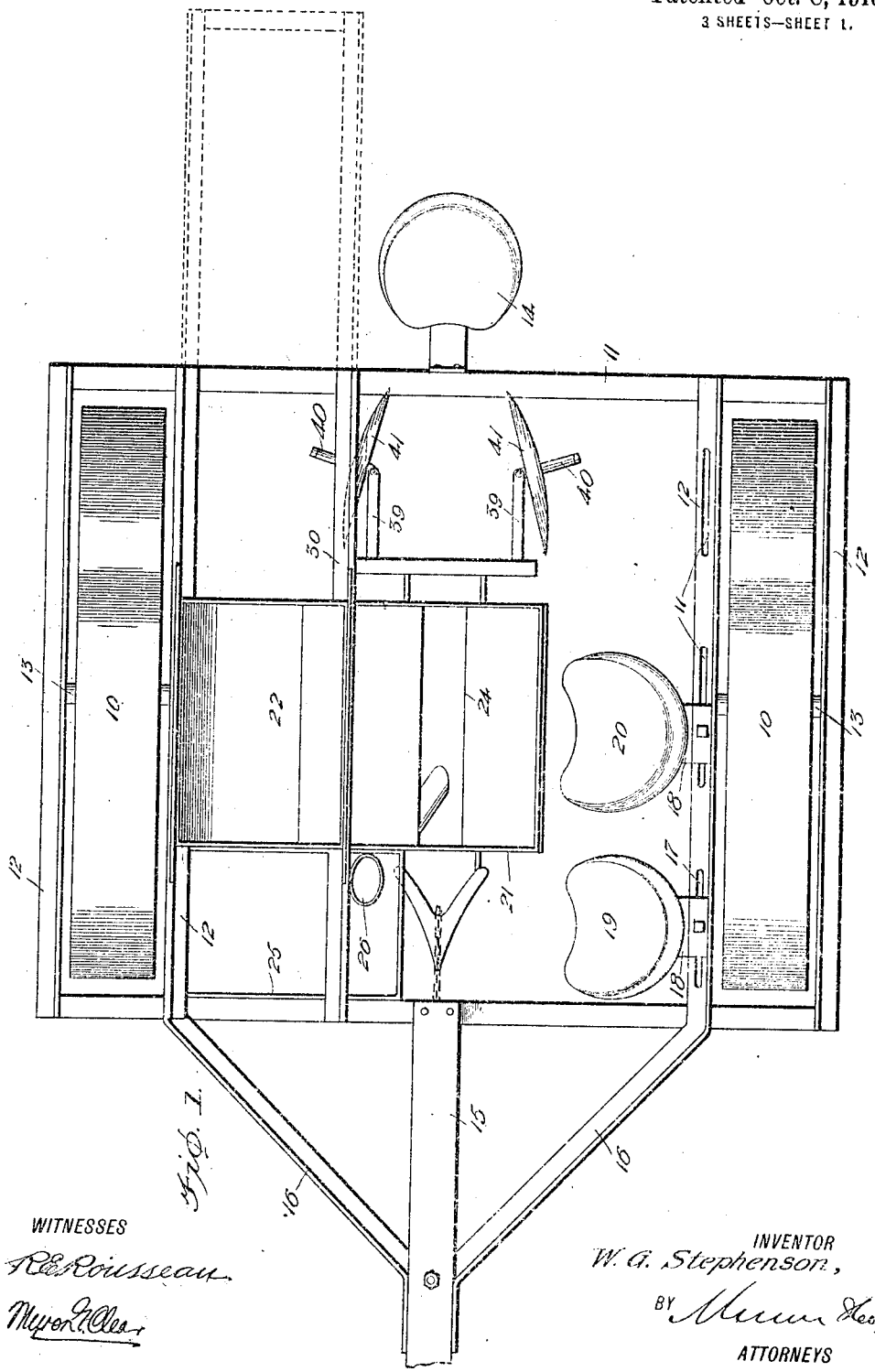

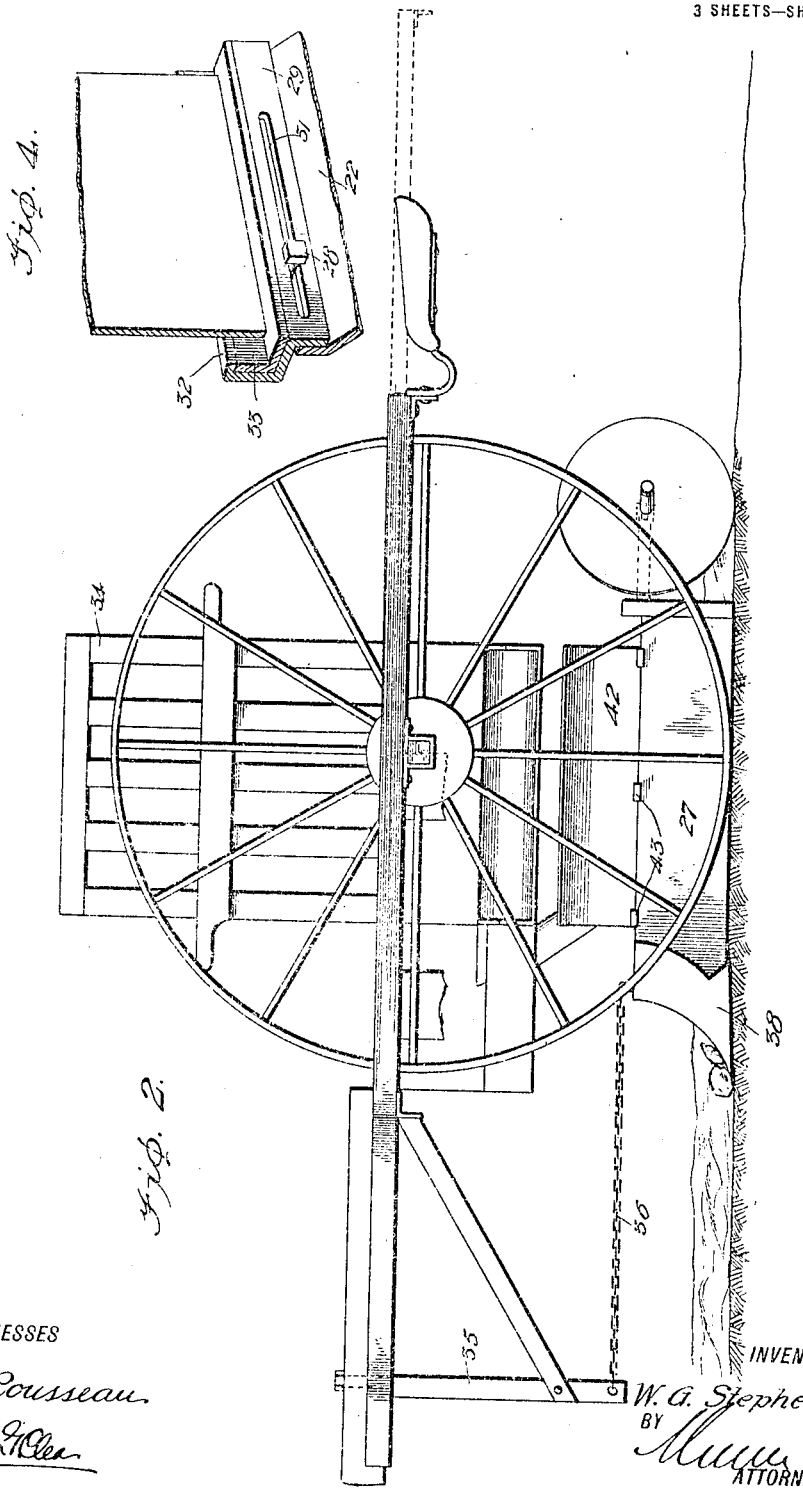

UNITED STATES PATENT OFFICE.

WALLACE GORDON STEPHENSON, OF OGDENSBURG, NEW YORK.

SUGAR-CANE PLANTER.

1,280,895.　　　　　Specification of Letters Patent.　　Patented Oct. 8, 1918.

Application filed December 24, 1917. Serial No. 208,640.

*To all whom it may concern:*

Be it known that I, WALLACE GORDON STEPHENSON, a citizen of the United States, and a resident of Ogdensburg, in the county of St. Lawrence and State of New York, have invented certain new and useful Improvements in Sugar-Cane Planters, of which the following is a specification.

My present invention relates generally to the planting of sugar cane, my primary object being the provision of means to facilitate this operation through the use of a machine in which the operator may be transported along the rows or lines of planting, with means to carry the seed cane and feed the same continuously with the assistance of the operator, to the previously prepared ground.

A further object of the invention is the provision of simple, inexpensive means for the above purpose which will be strong and durable in use and generally of a highly effective and efficient nature.

Other objects and the resulting advantages of my present invention will be better understood from the following description, preliminary to which it is to be noted that in planting sugar cane, what are known as the seed canes, are mere sections of cane of desired length which in the planting operation, are placed within a trench in suitably spaced relation and the trench afterward filled in or covered over with earth. With this in mind, it is believed the following description may be better understood and more thoroughly appreciated.

In the drawings illustrating the invention;

Figure 1 is a top plan view of my improved machine.

Fig. 2 is a side view thereof.

Fig. 3 is a rear elevation.

Fig. 4 is a detail section of certain parts to be hereinafter referred to.

Fig. 5 is a transverse vertical section taken through a modified form.

Referring now to these figures, my invention contemplates the provision of a machine movable upon side wheels 10, of which it will be noted there is but a single pair, as plainly seen by reference to Fig. 1. The several parts of the machine noted for its absence of all complicated parts likely to get out of order through handling by unskilled laborers in the field, are balanced upon these wheels, and the frame 11 of the machine, which is generally rectangular in shape, includes spaced parallel bars 12, in pairs adjacent opposite sides of the frame, which support the short axles or shafts 13.

The rear cross bar of the frame supports a driver's seat 14 at a point intermediate the sides, and the front cross bar is connected to the rear end of the tongue 15, which latter is braced by angle bars 16.

One of the inner bars 12 at one side of the frame has slots 17, in which the shanks 18 of seats 19 and 20 may be adjustably secured, the said seats facing laterally toward the central portion of the frame, and being respectively for the use of fertilizer and cane feeding operators.

The cane feeding operator sits at a point approximately centrally between the front and rear portions of the frame opposite the lower horizontal and upwardly opening cane box 21, which projects from the lower portion of an upwardly opening cane hopper 22, the base 23 of said cane box having a feed slot 24 downwardly through which the sections of cane are dropped by the operator as the machine proceeds along a previously prepared furrow indicated at A in Fig. 3.

The operator seated upon the seat 19, which latter may be positioned either at the front or the rear portion of the frame, is in use opposite the fertilizer box 25, from which the fertilizer is dipped in more or less measured quantities, and fed downwardly through the fertilizer feed chute 26, which extends at its lower end to a point slightly above the planting box 27, seen best in Figs. 2 and 3, this fertilizer box being adjustable to a point in the rear of the hopper 22, if so desired.

The hopper 22, a portion of which is seen in Fig. 4, is adjustably connected by one or more bolts 28 to the depending flanges 29 of the inner longitudinal bar 12 at one side of the main frame, and a bar 30 paralleling the same, said flanges 29 having elongated slots 31 for this purpose, as seen in Fig. 4, and the hopper is thus adjustable so that, considering the adjustment of the cane planter's seat 20, it is obvious that the weight may be distributed evenly and balanced upon the wheels 10 so that the apparent disadvantages of a lack of proper distribution of weight are avoided.

The bars 12 and 30 paralleling one another, as above stated for the adjustable reception therebetween of the hopper 22, are in the form of angle bars, whose upper edges have inturned flanges 32, as seen best in Fig. 4 overlapping the upper edges of angle bars 33 extending slidably into the same, these slidable angle bars 33 being connected to one another and forming a crate receiving frame slidable to a point rearwardly of the main frame, as indicated by dotted lines in Fig. 1, to facilitate the reception and removal of a seed crate such as indicated at 34, the latter being open at its lower end and receiving a plurality of sections of cut cane, normally held by cross pieces of cane to prevent the contents from escaping. These crates 34 open at their lower ends as stated, may thus be effectively and expeditiously placed upon the sliding bars 33 at the rear of the frame, and shifted with these sliding bars to points alined above the upper open end of the hopper 22. Then by removing the cross pieces of cane normally holding the main bulk of the cane from dropping, the supply of cane drops from the crate into the hopper and emerges from the latter into the feed box 21, and upon its slotted base 23, the operator seated upon the seat 20 feeding one or more of the cut cane sections at a time downwardly through the feed slot 24, and into the planting box 27. At the same time the operator seated upon seat 19 feeds a measured quantity of fertilizer into the chute 26, so that the same will drop with the cane as the latter is fed.

Depending from the tongue 15, is an upright 35 connected at its lower end by a chain 36 to the forward end of the planting box 27, preferably in the form of a clearing plow 38, capable of clearing debris and clods of earth from the previously prepared furrow which might otherwise prevent the sections of cane from properly resting in the bottom of the furrow, the planting box also including the side boards which project rearwardly from the plow 38, and have their rear ends connected by an inverted U-frame 39, as seen in Fig. 3, to which latter are adjustably secured rearwardly projecting bars 39, having pivoted adjustable shanks 40 at their rear ends forming foot pieces or rests for the driver seated upon the seat 14 and forming supports for the furrow closing disks 41.

The planting box 27 is also provided with upwardly and outwardly curved and longitudinally extending guide wings 42, as best seen in Figs. 2 and 3, hingedly connected by means of spring hinges 43 to the upper edges of the side boards of the planting box, and which serve to effectively guide the dropping sections of cane into the planting box in spite of the jolting and jarring of the main frame in operation, these wings being hinged in order to yield downwardly from their normal positions, as seen in Fig. 3, should an obstruction force the planting box upwardly against either the seat 20 or the feed box 21.

As above described, and as shown in Figs. 1 to 4, inclusive, the sections of cane fed by the operator through the feed slot 24 drop immediately, and by gravity, into the planting box 27, and thus into the furrow. It may be desirable to provide some mechanical feed by which the cane may be planted in uniformly spaced relation instead of by the mere guess of the operator, and to this end I may mount a horizontal laterally projecting shaft 50 beneath the hopper 22, as seen in Fig. 5, the outer end of which may be connected by gears 51 and 52 to the shaft of one of the wheels 10, and the inner end of which may carry a bevel gear 53 controlled by a spring clutch 54 and meshing with the bevel gear 55 of a cylinder 56 mounted longitudinally beneath the feed slot 24, and having radiating feed arms 57 between which the sections of cane are dropped from the feed slot, so that in the rotation of the cylinder 56 the latter will in turn deposit such sections of cane within the planting box 27, and thus within a prepared row at uniformly spaced points in the travel of the machine.

I claim:—

1. A machine of the character described including a wheeled main frame, a feed hopper in the frame having an upper open end and from the lower end of which the seed cane is fed, as desired, a seed holding crate above and opening into the hopper, and a support for said crate, said support being shiftable rearwardly beyond the main frame to facilitate the loading and removal of the crate for the purpose described.

2. A machine of the character described including a wheeled main frame, a feed hopper in the frame having an upper open end and from the lower end of which the seed cane is fed, as desired, a seed holding crate above and opening into the hopper, a frame slidable with respect to portions of the main frame to a point rearwardly of the latter, said latter frame removably supporting said crate and having movement with respect to the main frame to facilitate introduction and removal of the crate.

3. A machine of the character described including a wheeled main frame, a cane hopper within the frame having an upper open mouth and from the lower end of which the cane is fed, as desired, said main frame including parallel longitudinal bars along opposite sides of the upper open mouth of the hopper, a sliding frame including bars interfitting the said parallel bars of the main frame, and a seed cane holding crate open at its lower end and removably disposed in the said sliding frame for adjustment to and from a position above the open mouth of the hopper.

4. In a machine of the character described comprising a main wheeled frame, cane holding means within said frame, a feed box in communication with the cane holding means to receive cane therefrom and from which box the cane is selectively fed, and a planting box below and flexibly attached to the main frame, said planting box having upwardly projecting guide wings yieldably attached thereto for the purpose described.

5. A machine of the character described comprising a main frame, a single pair of side wheels upon which said frame is supported, a hopper adjustable longitudinally of the frame at one side thereof, a planter's seat adjustable longitudinally of the frame opposite the said hopper, a feed box between the said seat and the hopper, and connected to and communicating with the lower portion of the latter, said hopper having an upper open end, cane holding means disposed in the frame above the hopper to feed into the open end of the latter, and a driver's seat and draft attaching means carried by the main frame, all for the purpose described.

WALLACE GORDON STEPHENSON.

Witnesses:
EDNA I. CONNELL,
VIRGINIA STROMEYER.

Copies of this patent may be obtained for five cents each, by addressing the "Commissioner of Patents, Washington, D. C."